(12) United States Patent
Acuff, IV et al.

(10) Patent No.: US 11,319,169 B2
(45) Date of Patent: May 3, 2022

(54) MODULAR SINGLE-FORK LUMBER STACKING MACHINE

(71) Applicant: Woodflow LLC, Villa Rica, GA (US)

(72) Inventors: Lindsay Sims Acuff, IV, Atlanta, GA (US); Lindsay Sims Acuff, III, Atlanta, GA (US)

(73) Assignee: Woodflow, LLC, Villa Rica, GA (US)

( * ) Notice: Subject to any disclaimer, the term of this patent is extended or adjusted under 35 U.S.C. 154(b) by 0 days.

(21) Appl. No.: 17/411,490

(22) Filed: Aug. 25, 2021

(65) Prior Publication Data

US 2022/0063934 A1 Mar. 3, 2022

Related U.S. Application Data

(60) Provisional application No. 63/070,226, filed on Aug. 25, 2020.

(51) Int. Cl.
*B65G 57/10* (2006.01)
*B65G 57/18* (2006.01)
*B65G 47/29* (2006.01)

(52) U.S. Cl.
CPC ............. *B65G 57/10* (2013.01); *B65G 47/29* (2013.01); *B65G 57/18* (2013.01); *B65G 2201/022* (2013.01); *B65G 2203/0208* (2013.01)

(58) Field of Classification Search
CPC ........ B65G 57/10; B65G 57/18; B65G 47/29; B65G 2201/022; B65G 2203/0208
See application file for complete search history.

(56) References Cited

U.S. PATENT DOCUMENTS

| | | | |
|---|---|---|---|
| 3,887,060 A * | 6/1975 | Kamhues | B65G 47/26 414/791.8 |
| 7,811,047 B2 * | 10/2010 | Humble | B65G 57/24 414/789.5 |

* cited by examiner

*Primary Examiner* — Lynn E Schwenning
(74) *Attorney, Agent, or Firm* — Mehrman Law Office; Michael J. Mehrman

(57) ABSTRACT

The modular lumber stacker utilizes a single fork and board width sensor to load layers of boards with varying widths onto a lift table. The single-fork loader allows a fork lift to readily access the opposing side of the lift table to remove a multi-layer stack of boards. An adjustable unloading stop may be used to justify the stack by distributing the dead space in each layer between the boards to justify the stack to avoid jagged stack edges and improve stacking stability.

7 Claims, 14 Drawing Sheets

MODULAR SINGLE-FORK LUMBER STACKING MACHINE

REFERENCE TO RELATE APPLICATIONS

This application claims priority to U.S. Provisional Pat. App. Ser. No. 63/070,226 filed Aug. 25, 2020, which is incorporated by reference.

TECHNICAL FIELD

The present invention relates to lumber stacking machines and, more particularly, to a modular single-fork lumber stacking machine with a controller, board width sensor, and an adjustable stop to load layers of boards with varying widths onto a lift table with justified edges and distributed dead space.

BACKGROUND OF THE INVENTION

Lumber saws cut logs into boards of consistent thickness but varying width as the diameter of the sawn log changes. The boards of varying width are often stacked onto pallets for storage and shipping. Layers of boards assembled from boards of varying width generally vary in the overall layer width resulting in a stack with a jagged edge. Stack handling can be improved by justifying the layers to avoid jagged edges. According to one approach, the varying width boards are sorted into groups of boards with similar width to facilitate justified stacking. This approach requires expensive equipment to sort the boards into groups of similar width. Alternatively, dual-fork stackers have been used to distribute the dead space between the boards of each layer. This approach requires forks on both sides of the stack, which duplicates the number of forks and blocks access to both sides of the stack requiring equipment to be moved out of the way, or a full stack to be moved from the stacking table to allow a forklift to access to remove the stack. There is a need for an improved lumber stacker that avoids the drawbacks of these conventional lumber stacking machines.

SUMMARY OF THE INVENTION

The present invention meets the needs described above through a modular single-fork lumber stacking machine that utilizes a controller, board width sensor, and an adjustable stop to load layers of boards with varying widths onto a lift table. The single-fork design allows a fork lift to readily access the opposing side of the lift table to remove a multi-layer stack of boards assembled on the lift table. The controller, board width sensor, and adjustable stop may be used to justify the leading and trailing edges of the stack to avoid jagged stack edges. These features may also be used to distribute the dead space horizontally within each layer, and vertically between the layers, to stabilize the stack. The modular design includes a stacker module and a separate loader module that allows a forklift to separately lift, move and position each module to facilitate relocation and repositioning of the machine.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

DETAILED DESCRIPTION OF ILLUSTRATIVE EMBODIMENTS

Figure 1A:
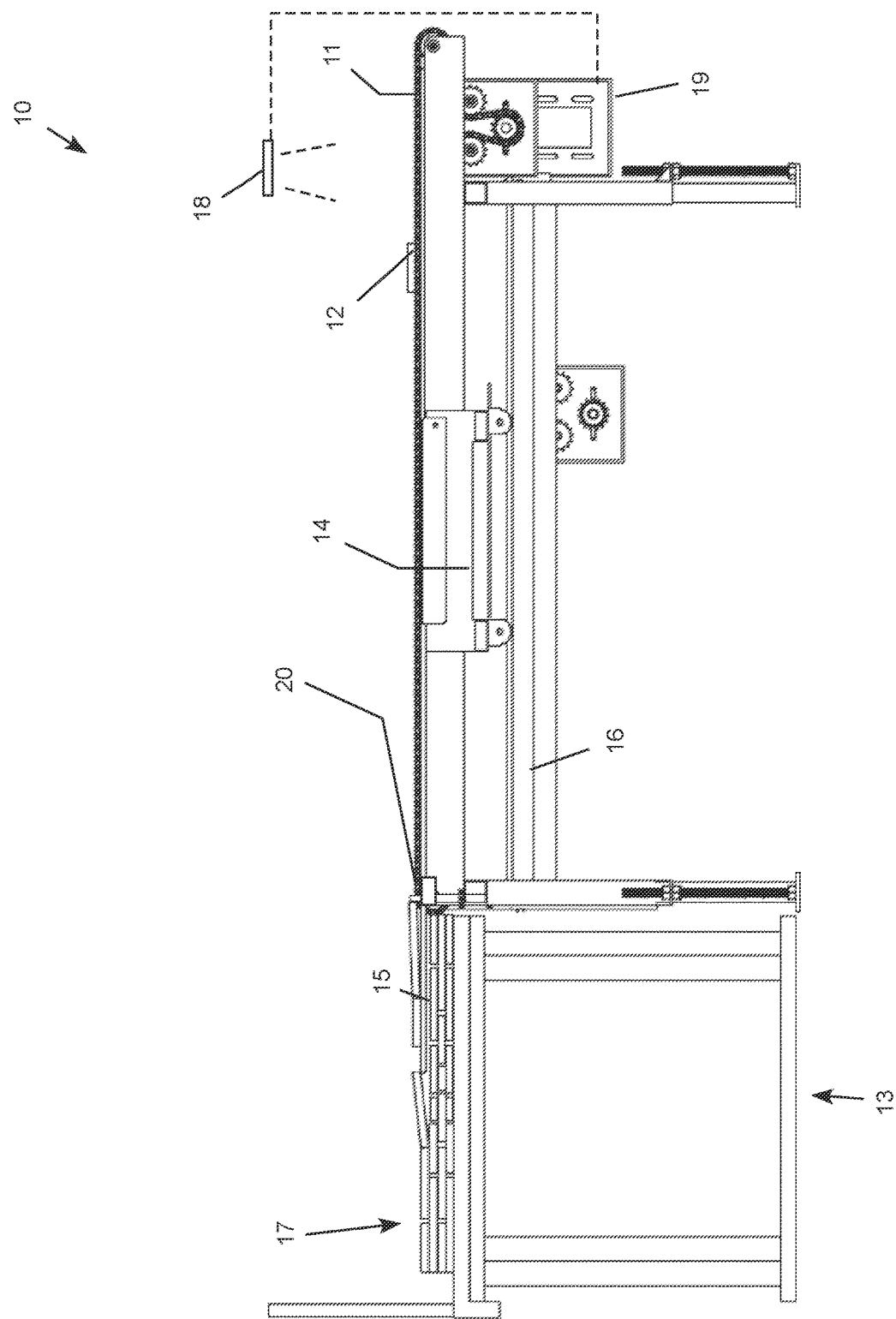
FIG. 1A is a side view of a single-fork lumber stacking machine.

The present invention may be embodied in a modular single-fork lumber stacking that utilizes a controller, a board width sensor, and an adjustable stop to load layers of boards with varying widths onto a lift table. The single-fork design utilizes fork arms on only one side of the lift table allowing a forklift to access the opposing side of the board stack to remove the board stack without having to move the lift table, board stack or other equipment to allow the fork lift to approach and remove the board stack. This represents a significant improvement over dual-fork lumber stackers that utilize forks on both sides of the stack to align the boards.

The controller, board width sensor, and adjustable stop may be used to finely position each board in a specific manner, for example to justify the leading and trailing edges of the stack to avoid jagged stack edges. These features may also be used to distribute the dead space horizontally within each layer, and vertically between layers, to stabilize the stack. To position the boards on the stack, the controller receives a board width measurement as each board is carried by a conveyor toward the lift table. The controller uses the board width measurements to move a carriage supporting a fork to position the fork arms to receive the boards of a layer on the forks in side-by-side positions. Once a full layer of boards has been positioned on the forks, the controller causes the carriage to retract to drop the layer of boards from the fork onto the stack, which is supported by the lift table. As the fork is retracted, the controller finely adjusts the position of the adjustable stop to finely position each board on the stack in a desired manner, for example to justify the leading and trailing edges of stack, and to distribute the dead space horizontally within each layer, and vertically between layers, to stabilize the stack. Justifying the leading and trailing edges of stack avoids jagged edged to facilitate banding or wrapping and palletizing the board stacks. Distributing the dead space improves stack stability. Once a layer has been dropped onto the stack, the controller causes the lift table to drop into position to receive the next layer of boards. The single-fork lumber stacking machine achieves these advantages at a very economical cost making the technology available to small and medium sized lumber mills that don't utilize the high-volume, high-cost stacking machines found in larger lumber mills.

The single-fork lumber stacking machine also has a modular design that includes a stacker module and a separate loader module. Each module is sized and configured to allow a forklift to separately lift, move and position each module to facilitate relocation and repositioning of the machine. The modules are connected by an electric cable with a plug between the modules. This allows both modules to be fed by a single power supply when the electric cable is joined at the plug, and picked up by the forklift and moved around separately when the electric cable is separated at the plug. This is an important advantage not found in lager high-speed, high-cost lumber stacking machines.

FIG. 1A shows a single-fork lumber stacking machine 10 with a conveyor 11 that moves boards of varying width, represented by the board 12, toward a lift table 13, which is also referred to as a stacker. A carriage 14 supporting a multi-arm fork 15 travels on a rail 16 to receive the boards from the conveyor, arrange the boards into layers of varying width boards 17, and drop the layers onto the lift table 13. The lift table 13 moves downward a board width for each layer dropped onto the stack until a full stack has been loaded onto the lift table. As each board travels on the conveyor, a board width sensor 18, such as an optical sensor, detects the width of each board. The board-width data is transmitted to a controller 19, which advances the position of the carriage 14 to position the fork 15 to receive each board side-by-side on the fork. This allows a layer of boards of varying width to be positioned side-by-side on the fork 15 above the lift table 13. Once a complete layer has been loaded into the fork 15, the controller causes an adjustable stop 20 to block the boards while the carriage retreats to drop the layer of boards onto the lift table 13 (onto the stack). The layers thus form a stack of layers of varying width boards 17 as they are dropped onto the lift table 13. As the carriage 14 retreats to pull the fork 15 out from under the layer of boards, the controller 19 finely adjusts the position of the adjustable stop 20 to dropped each board onto the stack in a desired location on the stack, for example to create a stack with justified leading and trailing edges, and to distributed dead space horizontally between the boards of each layer and vertically between the layers. Once a layer has been dropped onto the stack, the controller 11 causes the lift table 13 to drop into position to receive the next layer of boards.

Without the adjustable stop 20, the procedure described above produces an "unjustified" stack with a jagged leading edge (to the left in FIG. 1A) because the difference between the maximum layer width and the actual width of each layer produces dead space. Without the adjustable stop 20, the trailing edge of each layer (to the right in FIG. 1A) ends up aligned, while all of the dead space ends up positioned at the leading edge of each layer (to the left in FIG. 1A), resulting in a stack with a jagged leading edge. To produce a justified stack with aligned leading and trailing edges, the controller 19 controls the position of the adjustable stop 20 as the carriage 14 retreats, which finely positions each board on the stack, for example to create a stack with justified leading and trailing edges, and to distributed dead space horizontally between the boards of each layer and vertically between the layers. In various embodiments, the adjustable stop 20 may include two horizontal sets (linear arrays) of closely spaced servos, one set located at each side of each arm of the fork 15. The servo sets are spaces apart and aligned in the cross-conveyor direction, while each servo set includes a number of servos in the conveyor directions The controller operates the servos as the carriage 14 retreats to selectively block the trailing edge of the layer of boards at desired positions to drop each board at a desired position on the stack, and thereby justify the leading and trailing edges of the stack while distributing the dead space among the between the boards of each layer. Other types of adjustable stops may be utilized, such as a finger on a movable chain, a magnetically positioned finger, an eccentric gear, and so forth.

Figure 1B:
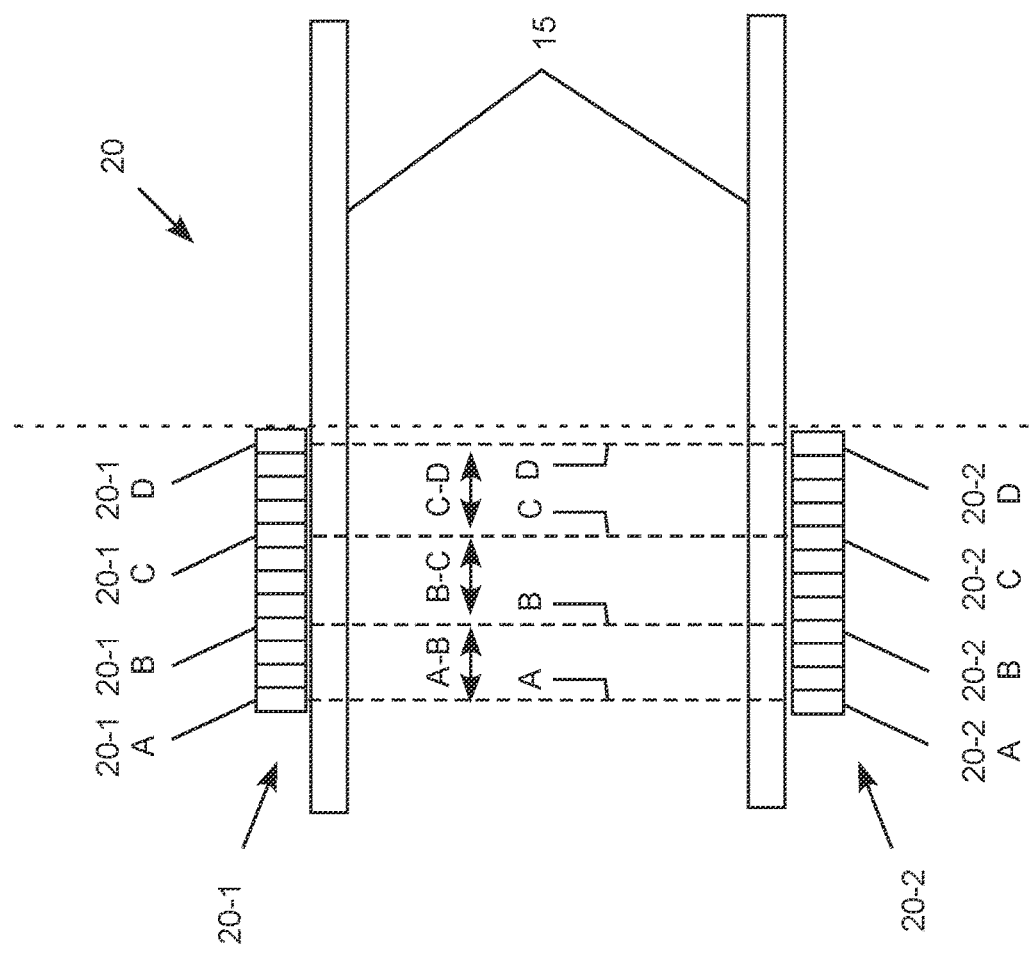
FIG. 1B is a conceptual illustration of an adjustable stop for the single-fork lumber stacking machine.

FIG. 1B is a conceptual illustration of an illustrative embodiment of the adjustable stop 20 for the single-fork lumber stacking machine 10, which is this example includes a first servo set 20-1 (linear array) and a second servo ser 20-2 (linear array). Referring to FIG. 1A along with FIG. 1B, the servo sets 20-1, 20-2 are spaced apart from each other and aligned in the cross-conveyor direction. For example, each servo set may be positions adjacent to a corresponding arm of the fork 15 that collects, and then drops, the layers of boards onto the board stack supported by the lift table 13. Each servo, when energized by under the control of the controller 19, raises a mechanical finger to prevent the boards on the fork 15 from moving with the fork as the fork retracts to drop a layer of boards on the conveyor 11. Each servo set 20-1, 20-2 includes a similar linear array of servos aligned in the conveyor direction in which the inter-servo distance defines the board placement resolution of the stacking machine 10. To illustrate one representative example, each servo set 20-1, 20-2 may be a 12-servo array with an inter-servo distance of 0.5 inches (1.3 cm) allowing the adjustable stop 20 to distribute up to 6.0 inches (15.2 cm) of dead space between the boards in 0.5 inch (1.3 cm) increments.

To provide one illustrative example, as shown in FIG. 1B, the controller 19 may initially energize servos 20-1A and 20-2A to raise their stop fingers at the leading edge of the servo arrays. After a first board is dropped onto the stack at the left edge (justification position) of the stack 17, the controller 19 then deenergizes energizes servos 20-1A and 20-2A while energizing servos 20-1B and 20-2B, which causes the fork 15 to drop a second board on the stack 17 with A-B dead space, in this example 1.5 inches (3 servos, 3.8 cm). The controller 19 then deenergizes servos 20-1B and 20-2B while energizing servos 20-1C and 20-2C, which causes the fork 15 to drop a third board on the stack 17 with B-C dead space, in this example 2 inches (4 servos, 5.1 cm). The controller 19 then deenergizes servos 20-1C and 20-2C while energizing servos 20-1D and 20-2D, which causes the fork 15 to drop a fourth board on the stack with C-D dead space, again in this example 2 inches (4 servos, 5.1 cm). The controller can thus justify the stack and distribute the dead space in accordance with programmed logic in response to varying board widths as they occur in the stacking process. Of course, the length of the servo arrays, the inter-servo distances, and the specific programmed stacking logic may be selected as a matter of design choice.

Figure 2:
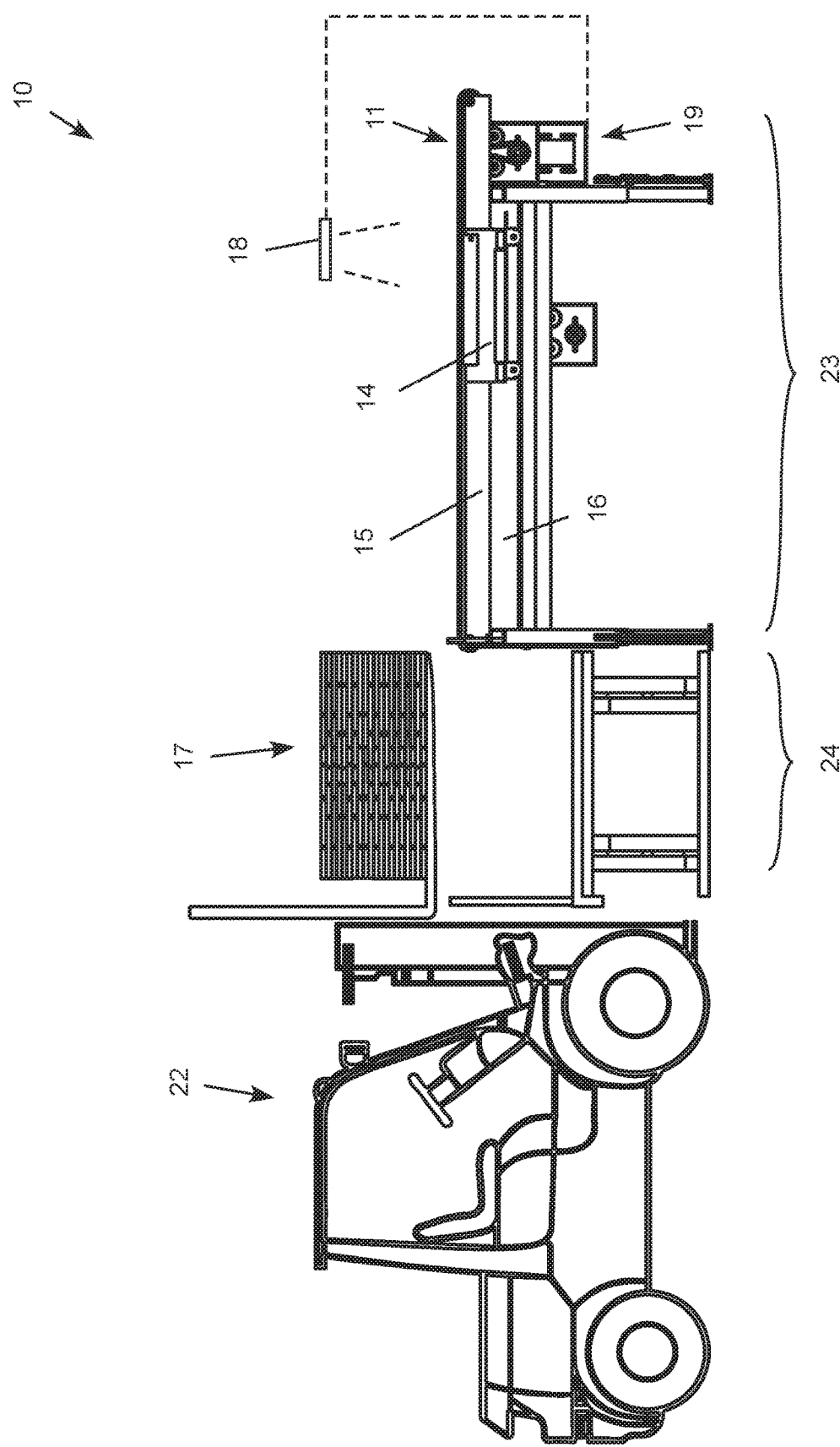
FIG. 2 is a side view of the single-fork lumber stacking machine showing modular sections and fork lift access removing a board stack.
Figure 3:
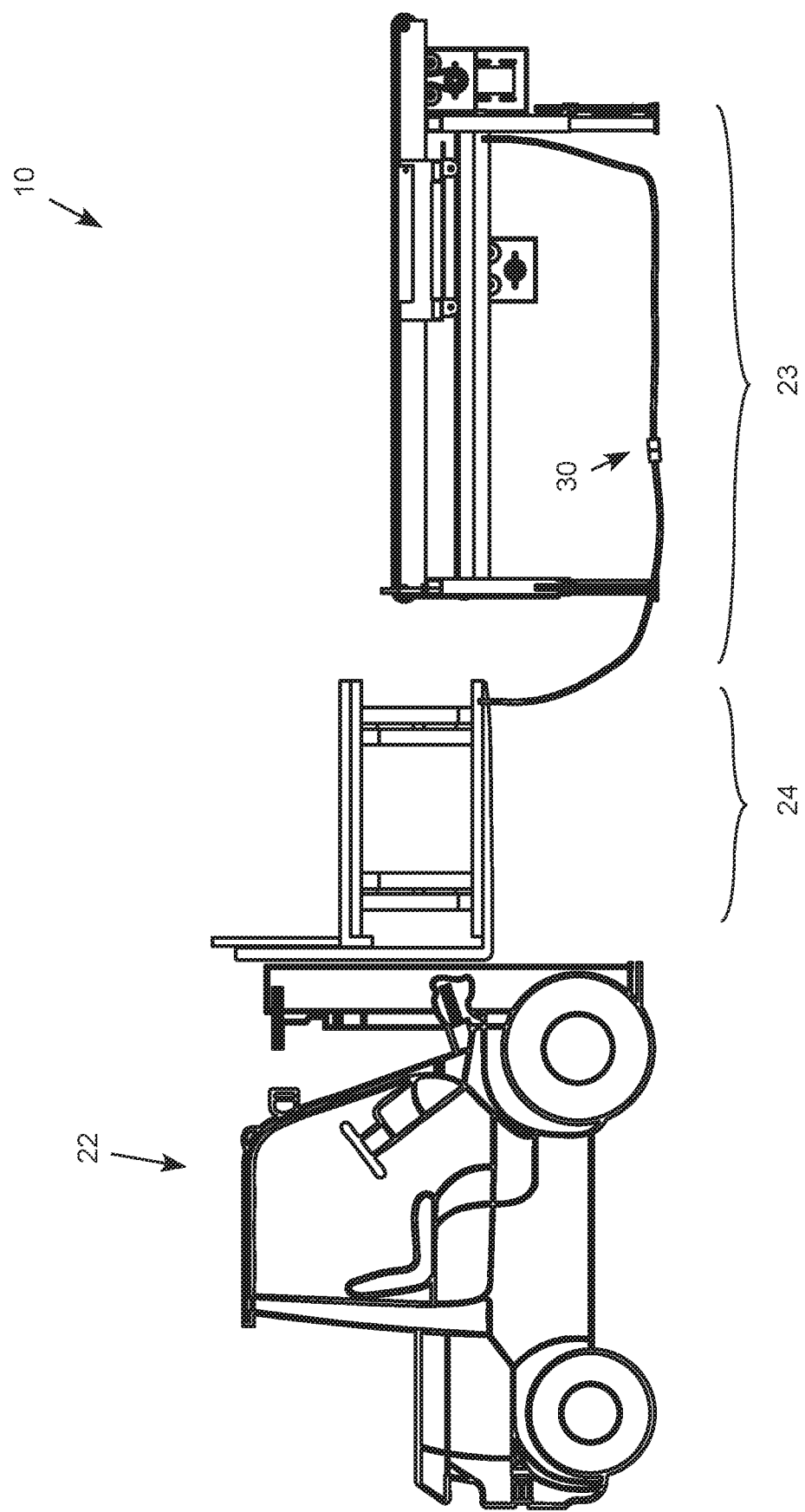
FIG. 3 is a side view of the single-fork lumber stacking machine showing fork lift assembly of the modular sections
Figure 4:
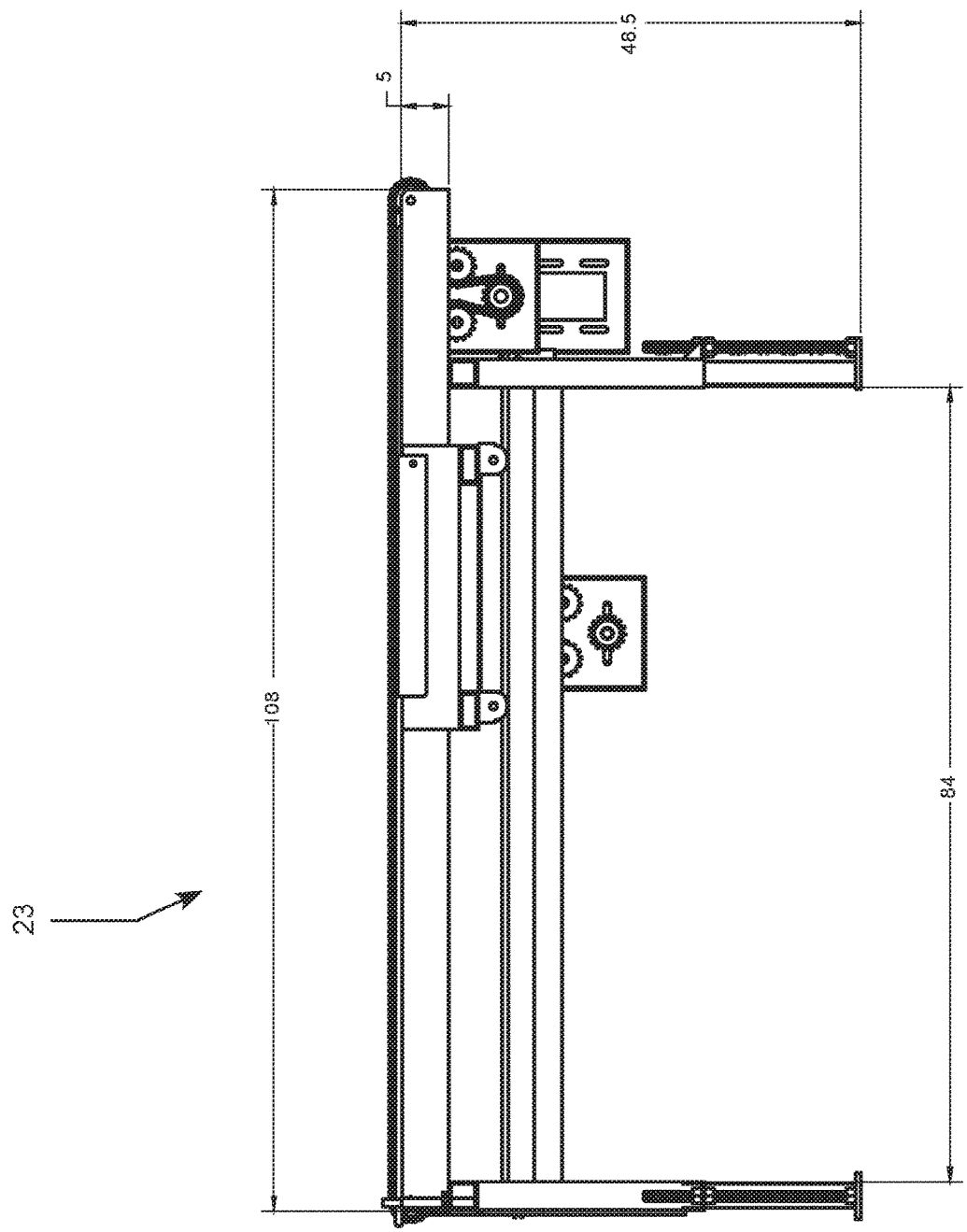
FIG. 4 is a side view of a loader module of a loader module of the single-fork lumber stacking machine showing dimensions of a representative embodiment.

FIG. 2 is a side view of the single-fork lumber stacking machine 10 showing modular sections approximately to scale, specifically a loader module 23 and a stacker module 24, and a fork lift 22 removing a board stack 17. As shown in FIG. 3, the loader module 23 has an electric plug 30 allowing the sections to be powered from a single source connected to one of the sections (typically the loader module 23), which also allows the sections to be unplugged from each other to facilitate moving each section separately. FIG. 3 shows the stacker module 24 lifted for transport by the forklift 22 separately from the loader module 23, while FIG. 4 shows specific dimensions (shown in inches) for a specific embodiment of the loader module 23 designed to be lifted by the forklift 22 and transported separately from the stacker module 24.

Figure 5:
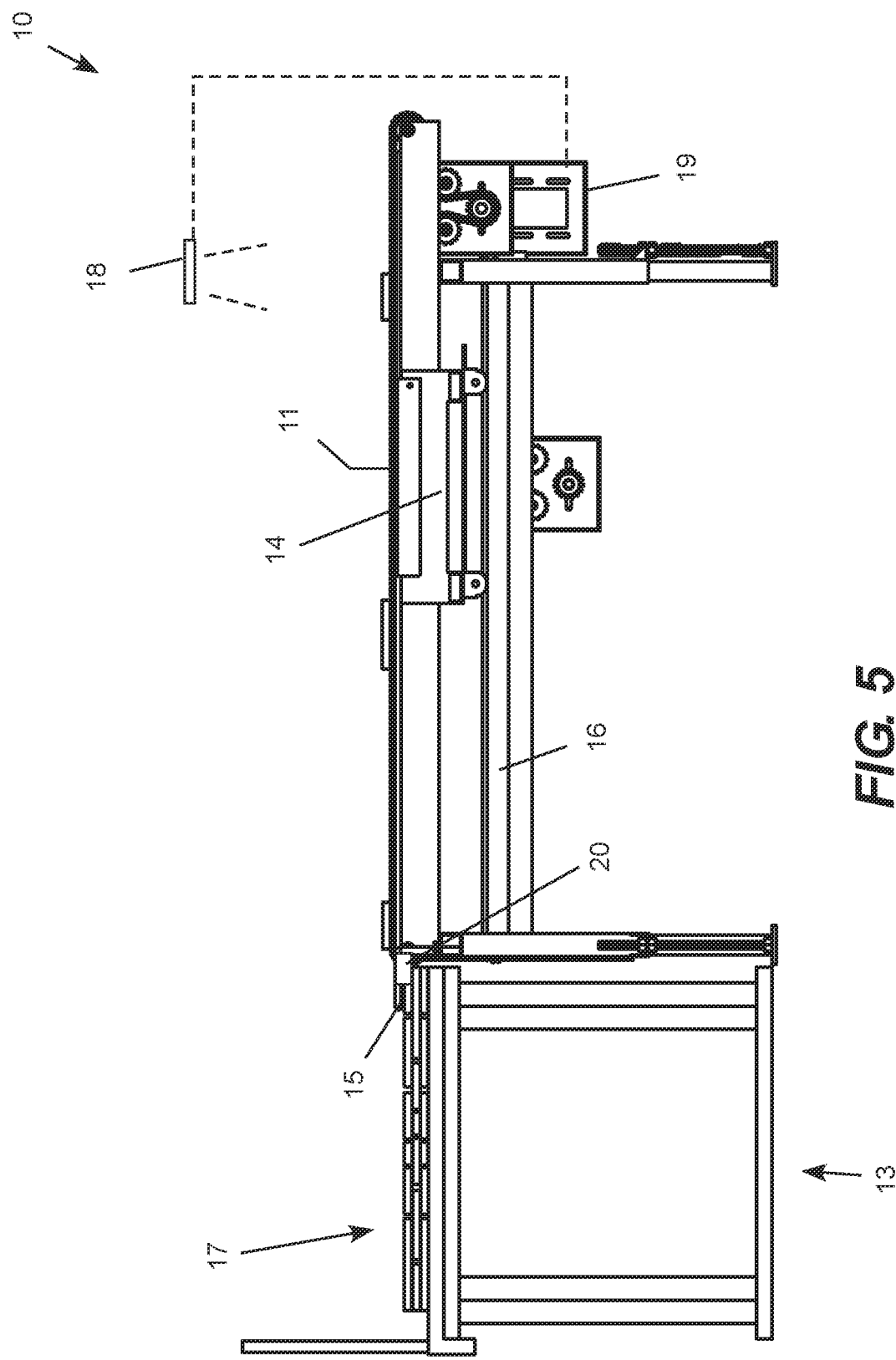
FIG. 5 is a side view of the single-fork lumber stacking machine in a first state of board stacking.
Figure 6:
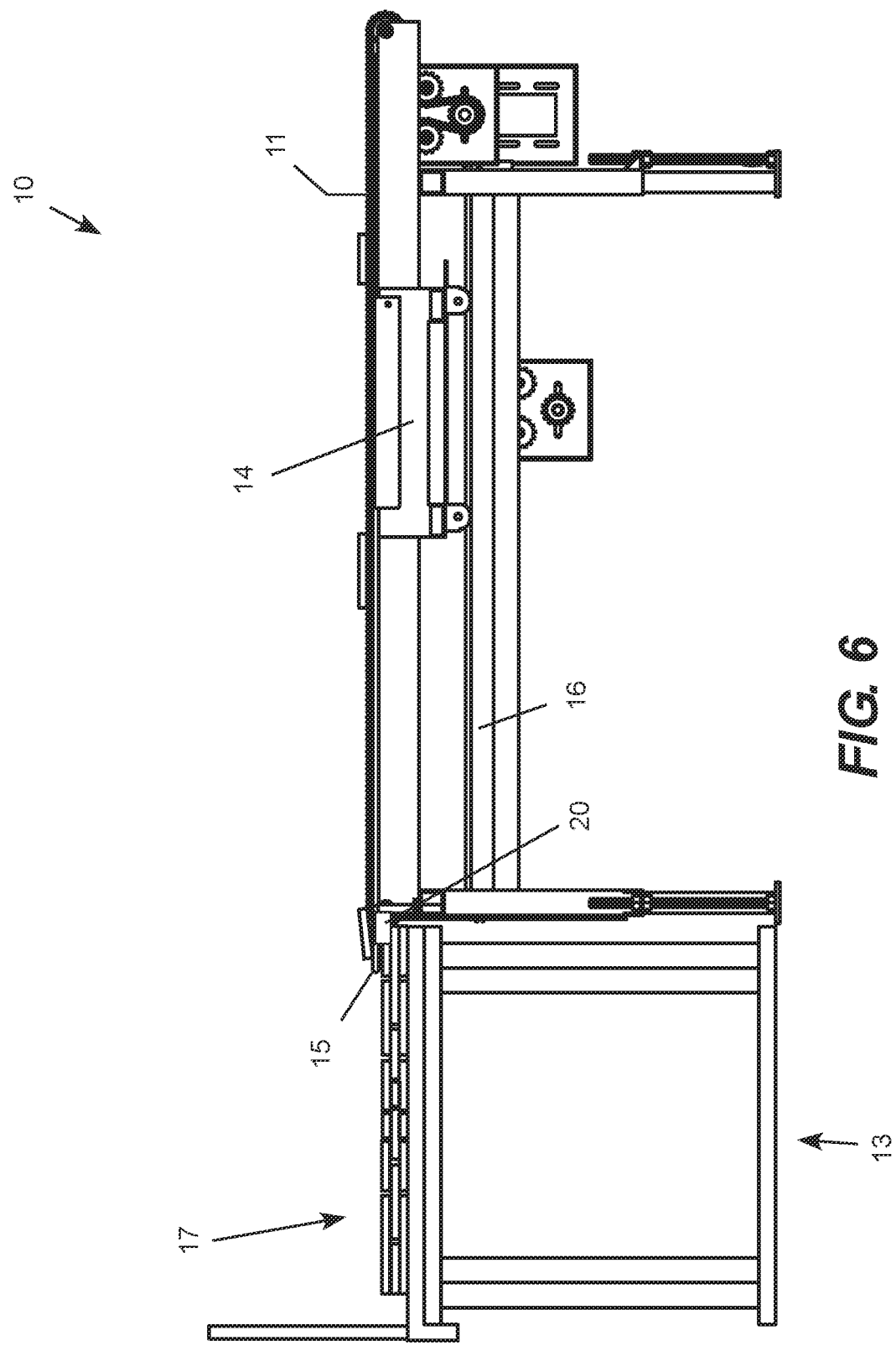
FIG. 6 is a side view of the single-fork lumber stacking machine in a second state of board stacking.
Figure 7:
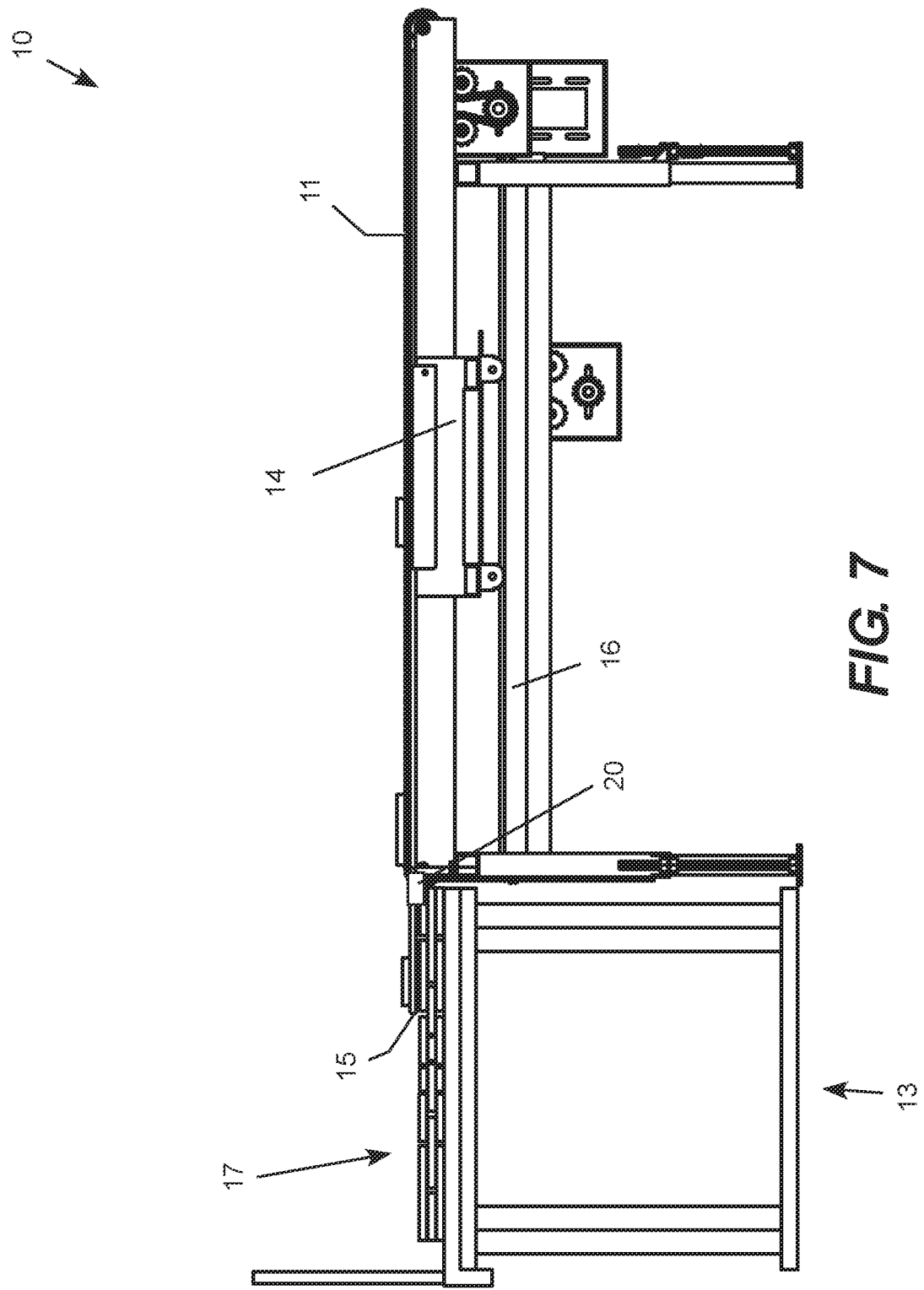
FIG. 7 is a side view of the single-fork lumber stacking machine in a third state of board stacking.
Figure 8:
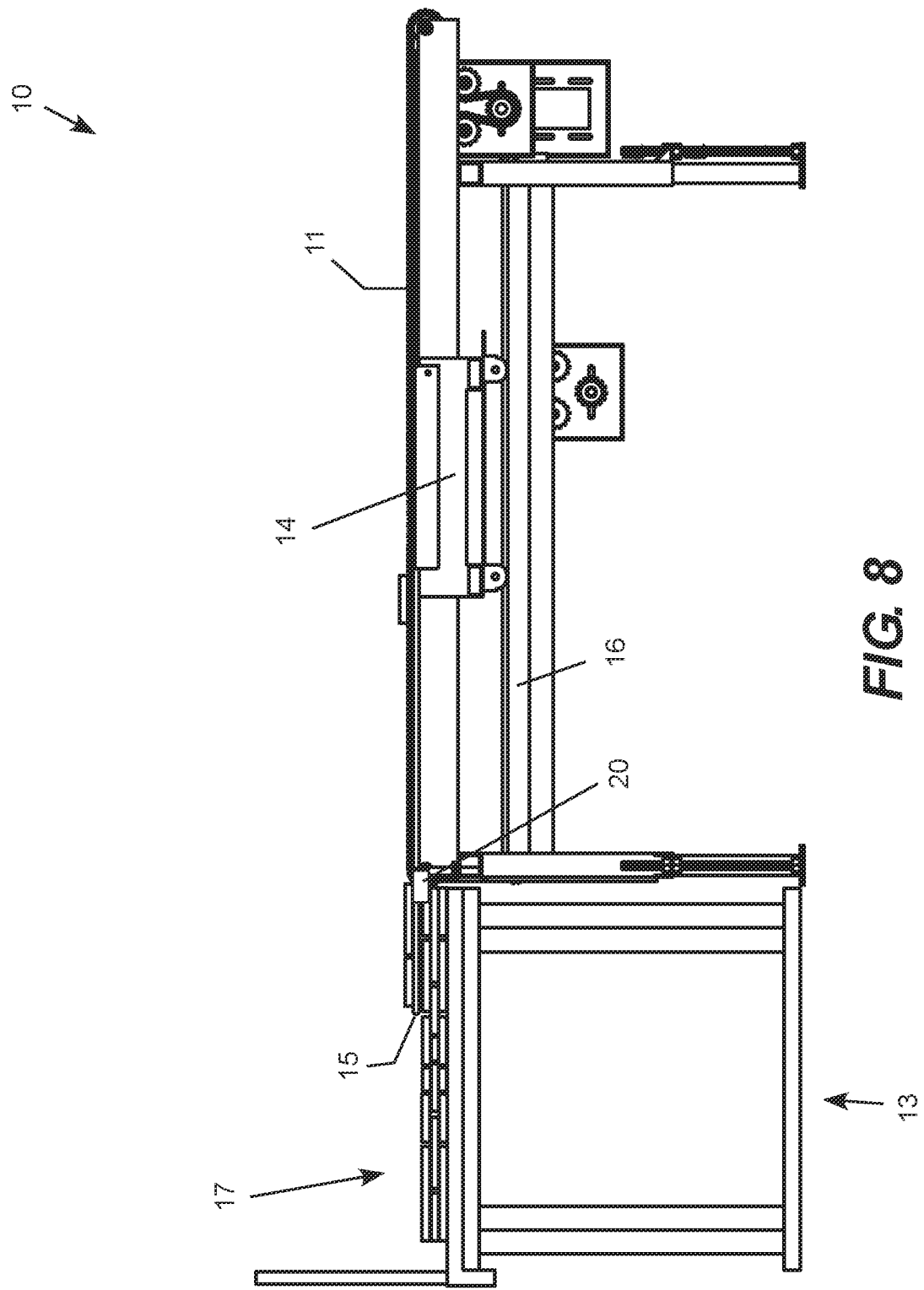
FIG. 8 is a side view of the single-fork lumber stacking machine in a fourth state of board stacking.
Figure 9:
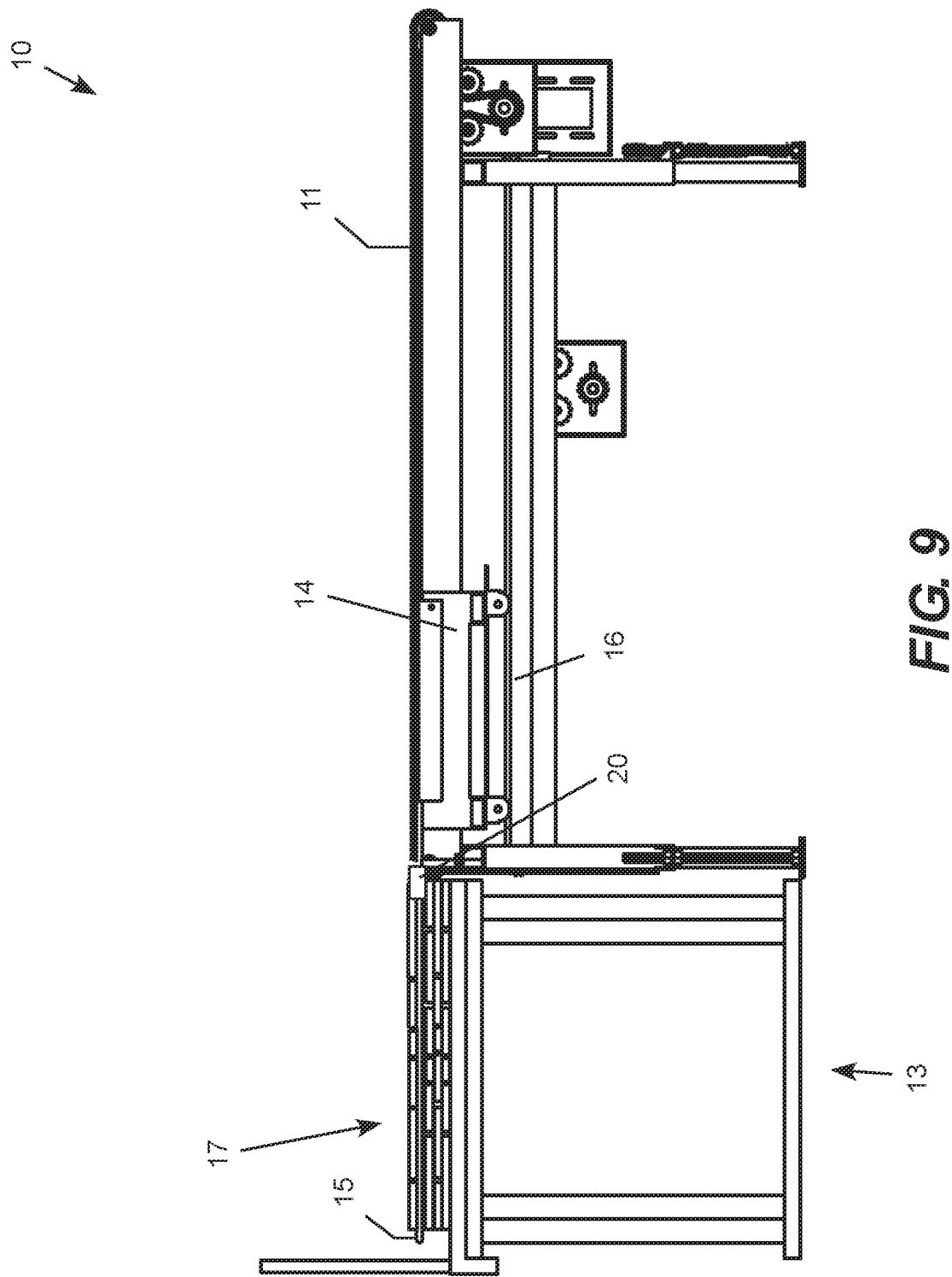
FIG. 9 is a side view of the single-fork lumber stacking machine in a fifth state of board stacking.
Figure 10:
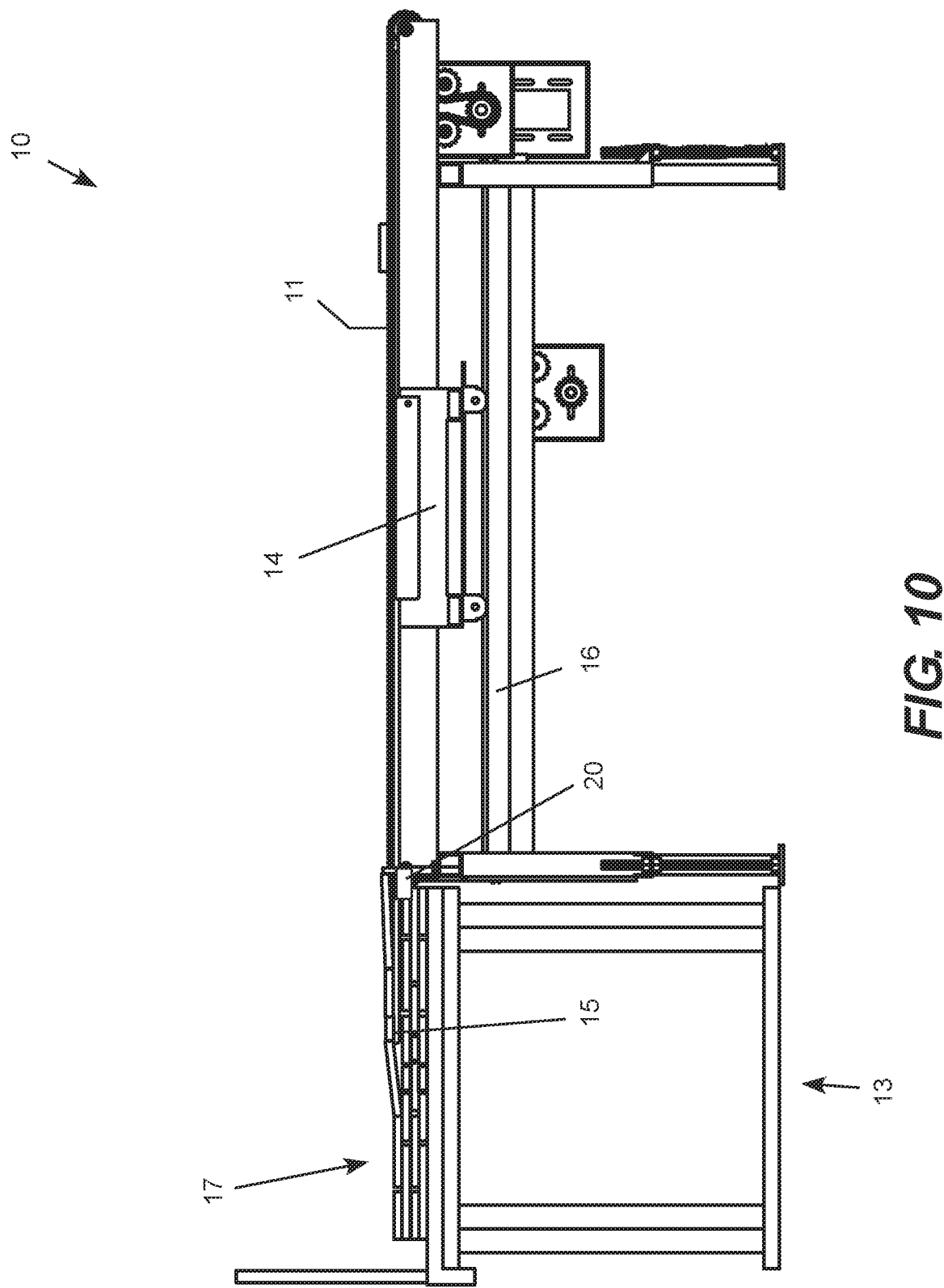
FIG. 10 is a side view of the single-fork lumber stacking machine in a sixth state of board stacking.
Figure 11:
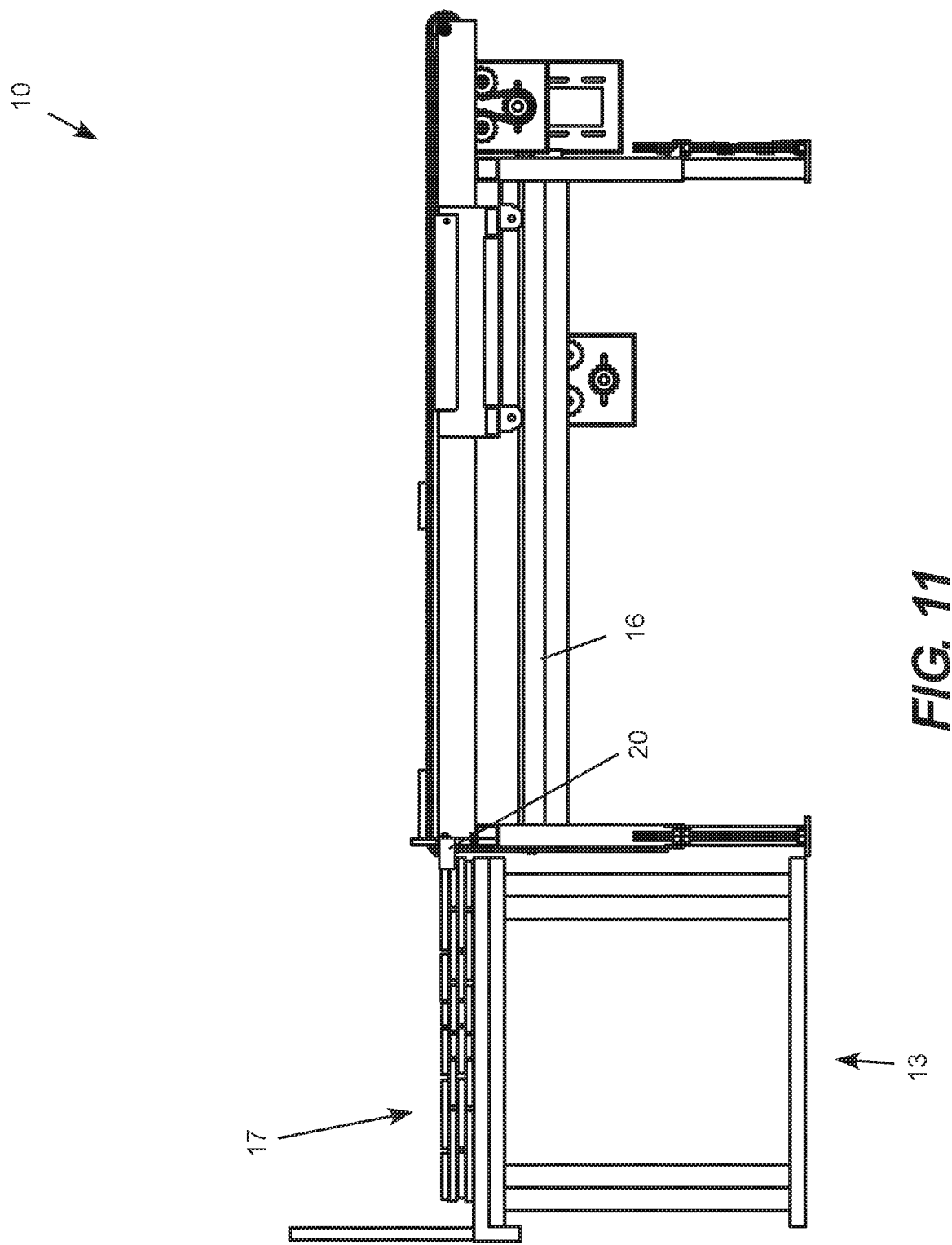
FIG. 11 is a side view of the single-fork lumber stacking machine in a seventh state of board stacking.
Figure 12:
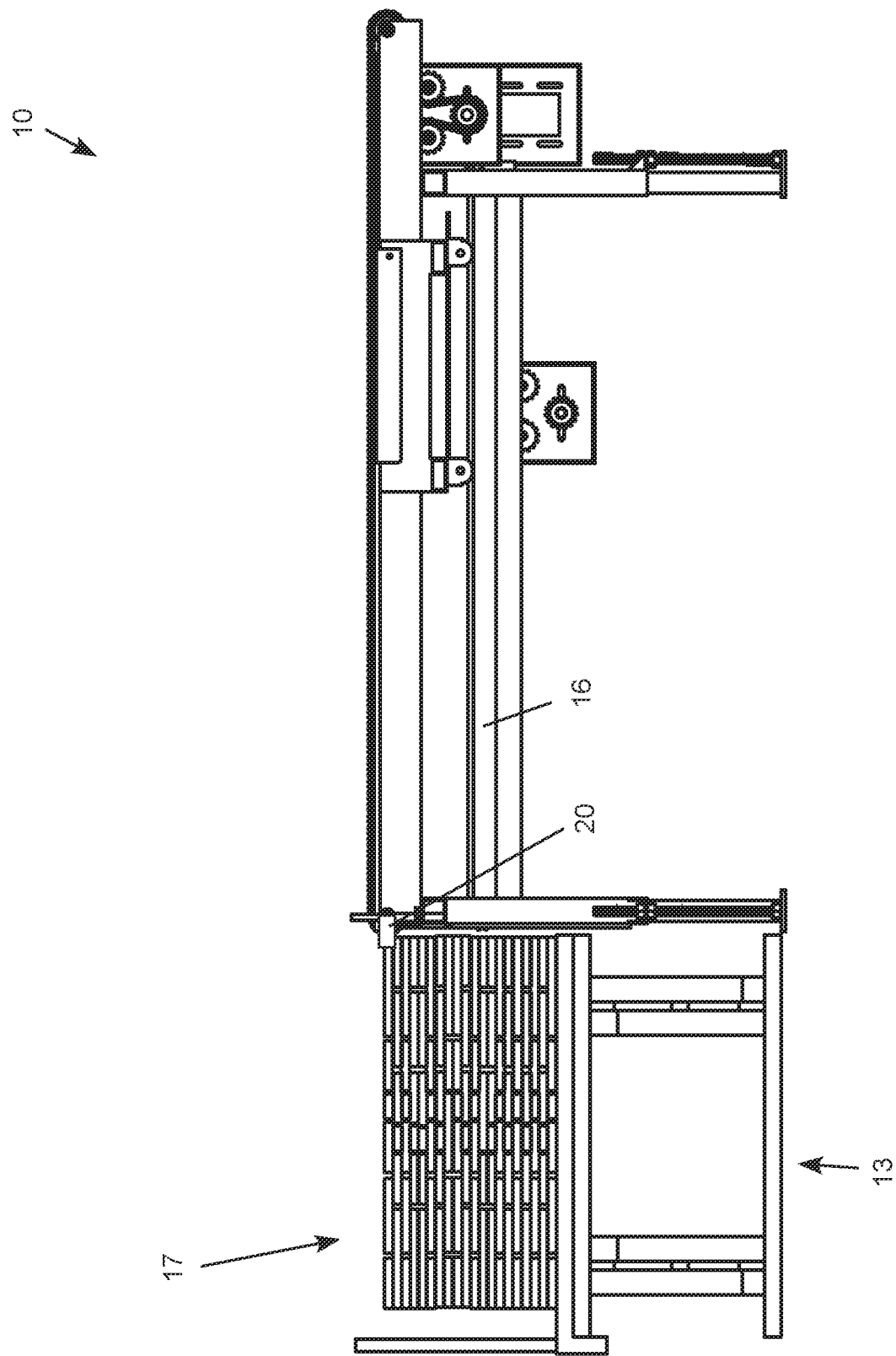
FIG. 12 is a side view of the single-fork lumber stacking machine showing stacking of a justifies bboard stack with distributed dead space.

FIG. 5-12 are a series of diagrams illustrating the single-fork lumber stacking machine 10 loading stack of varying-width boards onto the lift table 15. FIG. 5 shows the carriage 11 advanced in the conveyor direction (to the left in FIG. 5) a sufficient amount to receive a first board carried by the conveyor 11 onto the fork 15 supported by the carriage 14. This is accomplished by the board-width sensor 18, which detects the width of the boards while they travel on the conveyor 11 and provides the board-width measurements to the controller 19, which drives the motor that controls the position of the carriage 14, which travels along the rail 16. For the first board of the layer, the controller 19 advances the position of the carriage 14 an amount sufficient beyond the end of the conveyor 11 to receive a first board onto the fork 15 based on the measurement of the width of the first board. FIG. 6 shows the conveyor 11 dropping the first board onto the fork 15. FIG. 7 shows the carriage 11 advanced in the conveyor direction a sufficient amount to receive a second board carried by the conveyor 11 onto the fork 15. Again, this is accomplished by the board-width sensor 18, controller 19 and carriage 14, which is advanced in the conveyor direction a sufficient amount to receive a second board in side-by-side relation to the first board. FIG. 8 shows the machine 10 after the second board has been dropped onto the fork 15 alongside the first board. FIG. 9 shows the machine 10 after a full layer of boards of varying widths have been loaded side-by-side onto the fork 15. FIG. 10 shows the machine 10 as the carriage 14 is retracted (to the right in FIG. 5) to pull the fork 15 out from under the layer of boards to drop the layer onto the stack supported by the lift table 13. Referring to FIG. 11, as the controller 19 directs the retraction of the carriage 14, it also controls the adjustable stop 20 to justify the leading and trailing edges of the stack while distributing the dead space both horizontally between the boards of each layer and vertically between the layers. FIG. 12 shows the machine 10 after a full stack of boards of varying width have been loaded onto the lift table 13 with the leading and trailing edges of the stack justified and the dead space distributed both horizontally between the boards of each layer and vertically between the layers.

Figure 13:
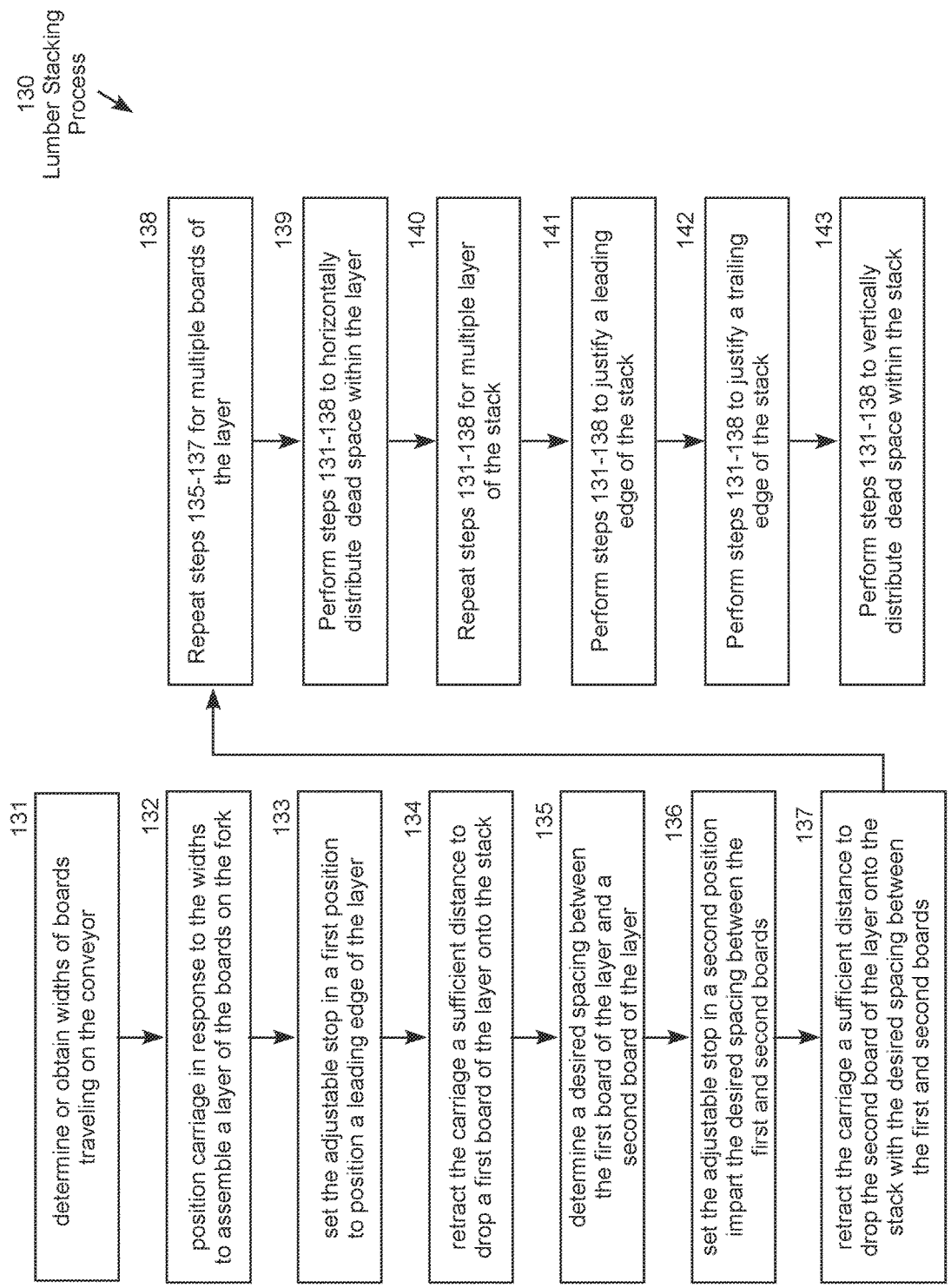
FIG. 13 is a logic flow diagram illustrating a process for stacking boards of varying width with the single-fork lumber stacking machine.

FIG. 13 is a logic flow diagram illustrating a process 130 for stacking boards of varying width with the single-fork lumber stacking machine 10. In step 131, the machine's controller determines or obtains widths of boards traveling on the conveyor 11, typically by receiving the widths from the board width sensor 18 or computing the widths based on data received from the board width sensor. Step 131 is followed by step 132, in which the machine's controller positions the carriage 14 in response to the board widths to assemble a layer of the boards side-by-side on the fork, typically by driving one or more motors that move the carriage along the rail 16. Step 132 is followed by step 133, in which the machine's controller sets the adjustable stop in a first position to position a leading edge of the layer, typically to start a stack or justify the leading edge with one or more underlying layers of a stack previously dropped onto the lift table (stacker) 13. Step 133 is followed by step 134, in which the machine's controller retracts the carriage a sufficient distance to drop a first board of the layer onto the stack. Step 134 is followed by step 135, in which the machine's controller determines a desired spacing between the first board of the layer and a second board of the layer, typically to distribute dead space horizontally within the layer and vertically between layers. Step 135 is followed by step 136, in which the machine's controller sets the adjustable stop in a second position to impart the desired spacing between the first and second boards. Step 136 is followed by step 137, in which the machine's controller retracts the carriage a sufficient distance to drop the second board of the layer onto the stack with the desired spacing between the first and second boards. Step 137 is followed by step 138, in which the machine's controller repeats the steps 135 through 137 for multiple boards of the layer. Step 138 is followed by step 139, in which the machine's controller selects the board spacing to horizontally distribute dead space between multiple boards of the layer. Step 139 is followed by step 140, in which the machine's controller repeats the steps 131 through 138 for multiple layers to form a stack of the boards on the lift table. Step 140 is followed by step 141, in which the machine's controller vertically aligns the first board of each layer of to justify the leading edge of the stack. Step 141 is followed by step 142, in which the machine's controller vertically aligns the last board of each layer of to justify the trailing edge of the stack. Step 142 is followed by step 143, in which the machine's controller selects the board spacing to vertically distribute dead space vertically between multiple layer of the stack. It will be appreciated that in practice board spacing selection is implemented as the boards are sequentially dropped onto conveyor, but in some cases have been illustrated as occurring after board placement for descriptive convenience.

The present disclosure is implemented using a programmed controller 19, which may be a general purpose computing device adapted for this particular purpose. As such, the controller 19 includes an input receiver, which may be hard-wired or wireless, operative to receive input signals from board width sensor 18. The controller also includes a microprocessor, which may be located locally, remotely, on a network, remotely, in the cloud, or any other physical location or locations that modern technology permits. The controller also includes a memory that stores non-transient computer-executable instructions implementing specialized computer software. The software runs on the microprocessor to compute output control signals, which may be hard-wired or communicated wirelessly, to control one or more motors that drive the carriage 14 and the adjustable stop 20 to implement the board stacking techniques described above, for example to load justified stacks boards of varying thickness with the dead space distributed throughout the stacks. Embodiments of the disclosure may comprise adapting or reconfiguring presently existing equipment with type of computer-controlled technology. Alternatively, original equipment may be provided embodying the disclosure.

All of the methods described in this disclosure therefore include storing non-transient computer-executable instructions and associated results in a non-transient storage medium. These computer-executable instructions and results may include any of the computer-implemented procedures or results described in this disclosure and may be stored in any manner known in the art. The storage medium may include any storage medium described in this disclosure or any other suitable storage medium known in the art. After the computer-executable instructions or results have been stored, they can be accessed in the storage medium and used by any of the method or system embodiments described in this disclosure, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally comprises one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as microprocessors executing computer-executable software. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. it will therefore be appreciated that present invention provides significant improvements in electric power circuit reclosers. The foregoing relates only to the exemplary embodiments of the present invention, and that numerous changes may be made therein without departing from the spirit and scope of the invention as defined by the following claims.

It should be understood that the foregoing relates only to the exemplary embodiments of the present invention, and that numerous changes may be made therein without departing from the spirit and scope of the invention as defined by the following claims.

The invention claimed is:

1. A lumber stacking machine, comprising:
 a loader module comprising a conveyor for transporting a series of boards of varying width;
 a stacker module comprising a lift table for receiving the boards from the conveyor stacked into layers;
 wherein the loader module further comprises a board width sensor for detecting the width of each board as it travels along the conveyor, a controller for receiving each board width measurement from the board width sensor, a rail, a carriage movable along the rail, a fork supported by the carriage, and an adjustable stop for selectively blocking movement of the boards to force the boards to drop off the rail as the rail retracts while carrying a layer of the boards;

wherein the controller comprises a microprocessor and a memory storing non-transient computer-executable instructions which, when executed by the microprocessor, causes the microprocessor to:

(a) determine or obtain widths of boards traveling on the conveyor;

(b) position the carriage in response to the widths of a plurality of the boards to assemble a layer of the boards on the fork, (c) set the adjustable stop in a first position to position a leading edge of the layer, (d) retract the carriage a sufficient distance to drop a first board of the layer onto the stack, (e) determine a desired spacing between the first board of the layer and a second board of the layer, (f) set the adjustable stop in a second position to impart a desired spacing between the first and second boards, (g) retract the carriage a sufficient distance to drop the second board of the layer onto the stack with the desired spacing between the first and second boards.

2. The lumber stacking machine of claim 1, wherein the computer-executable instructions, when executed by the microprocessor, further cause the microprocessor to repeat the steps (e) through (g) for multiple boards of the layer.

3. The lumber stacking machine of claim 2, wherein the computer-executable instructions, when executed by the microprocessor, further cause the microprocessor to horizontally distribute dead space between multiple boards of the layer.

4. The lumber stacking machine of claim 1, wherein the computer-executable instructions, when executed by the microprocessor, further cause the microprocessor to repeat the steps (a) through (g) for multiple layers to form a stack of the boards on the lift table.

5. The lumber stacking machine of claim 4, wherein the computer-executable instructions, when executed by the microprocessor, further cause the microprocessor to vertically align the first board of each layer of to justify the leading edge of the stack.

6. The lumber stacking machine of claim 5, wherein the computer-executable instructions, when executed by the microprocessor, further cause the microprocessor to vertically align a last board of each layer of to justify a trailing edge of the stack.

7. The lumber stacking machine of claim 4, wherein the computer-executable instructions, when executed by the microprocessor, further cause the microprocessor to distribute dead space vertically between multiple layer of the stack.

* * * * *